United States Patent [19]
Hong

[11] Patent Number: 6,018,408
[45] Date of Patent: Jan. 25, 2000

[54] LASER PROJECTION DISPLAY APPARATUS

[75] Inventor: Seong Soo Hong, Cheju, Rep. of Korea

[73] Assignee: Samsung Electronics Co., Ltd., Suwon, Rep. of Korea

[21] Appl. No.: 09/276,664

[22] Filed: Mar. 26, 1999

[51] Int. Cl.[7] .................................................. G02B 26/08
[52] U.S. Cl. .......................... 359/201; 359/202; 359/204; 347/235; 347/243; 348/744; 348/756; 250/234; 250/236
[58] Field of Search ..................................... 359/201, 202, 359/204; 347/235, 243; 348/744, 745, 746, 747, 754, 756; 250/230, 234, 236

[56] References Cited

U.S. PATENT DOCUMENTS

| | | | |
|---|---|---|---|
| 5,210,635 | 5/1993 | Nagata et al. | 359/204 |
| 5,608,563 | 3/1997 | Matsumura et al. | 359/201 |

FOREIGN PATENT DOCUMENTS 1998-067811  10/1998  Rep. of Korea .

*Primary Examiner*—Darren E. Schuberg
*Attorney, Agent, or Firm*—Burns, Doane, Swecker & Mathis, L.L.P.

[57] ABSTRACT

A laser projection display apparatus including an optical separating device for separating a white light beam emitted from a first optical source into red, green, and blue monochromic light beams, an image signal processing unit for separating a received composite image signal into an image signal and horizontal and vertical synchronous signals, an optical modulator for modulating the monochromic beams according to the image signal output by the image signal processing unit, a galvanometer and a rotating polygonal mirror for vertically and horizontally projecting the modulated beams, respectively, on a screen, a second optical source for radiating light on the reflection planes of the rotating polygonal mirror, and an optical detector for detecting light emitted from the second optical source and reflected by the reflection planes of the rotating polygonal mirror, and transmitting the detection signal to the image signal processing unit, when a starting point of horizontal projection by the rotating polygonal mirror is made on a predetermined vertical line on the screen, wherein the image signal processing unit synchronizes the image signal with the detection signal of the optical detector and outputs the synchronized image signal to the optical modulator.

5 Claims, 3 Drawing Sheets

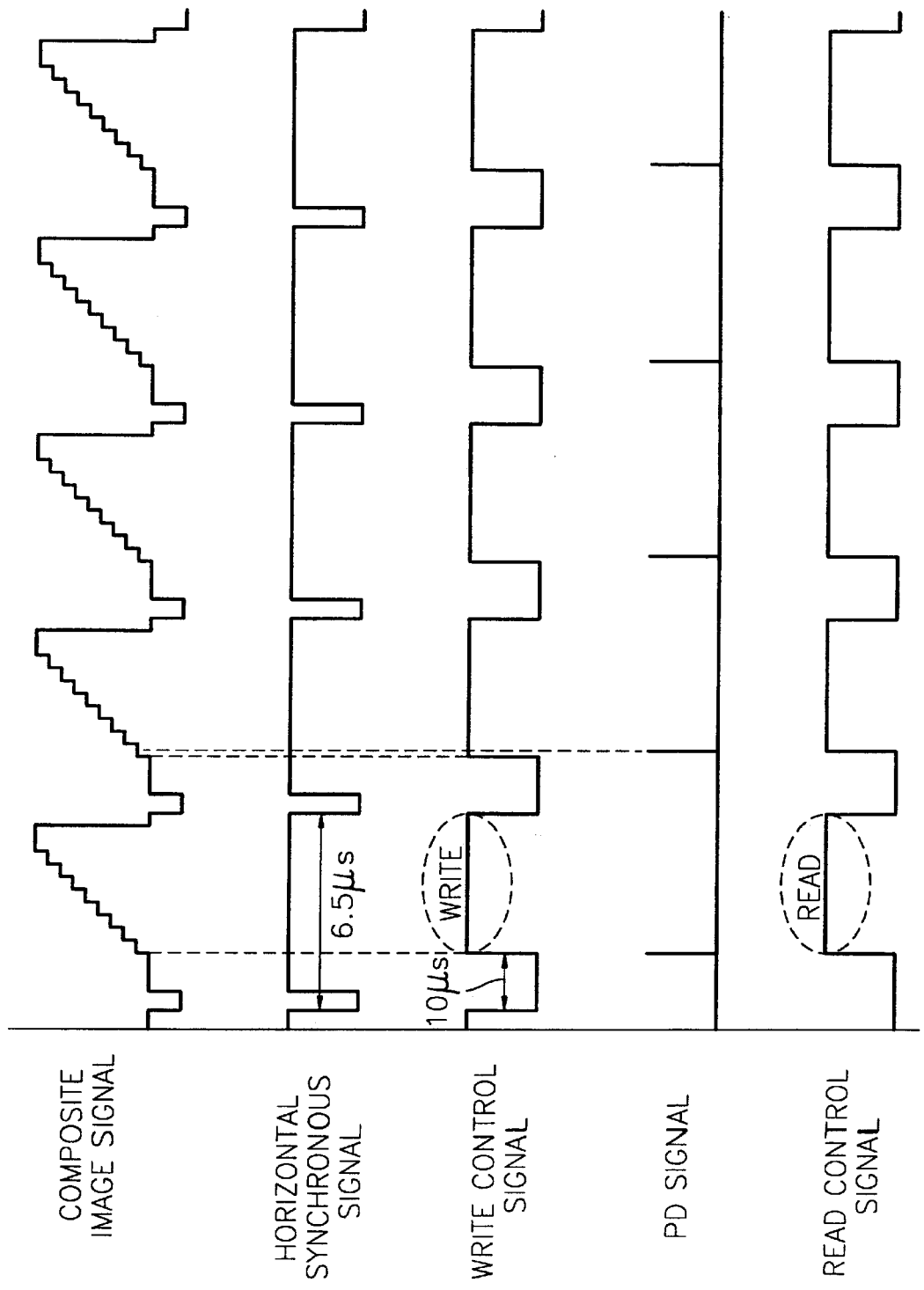

LASER PROJECTION DISPLAY APPARATUS

BACKGROUND OF THE INVENTION

1. Field of the Invention

The present invention relates to a laser projection display apparatus, and more particularly, to a laser projection display apparatus designed to determine the point in time of starting projecting an image signal by acquiring information on the rotation position of a rotating polygonal mirror.

2. Description of the Related Art

Currently, a cathode ray tube (CRT) and a liquid crystal display (LCD) are used as an image display device. However, realization of a large screen of the CRT or LCD is difficult, and the resolution of images is low.

A laser projection display apparatus obtains colors close to natural colors while satisfying a demand for an enlarged and high resolution display device. Also, the laser projection display apparatus is being applied in various fields such as electronic billboards, laser shows, and large-sized television image displays because of its high luminance property.

The laser projection display apparatus vertically projects laser beams, emitted from an optical source, onto a screen by means of a galvanometer, and horizontally projects the laser beams by means of a rotating polygonal mirror, thereby displaying images. As for television images, laser beams are vertically projected in a saw tooth wave of 60 Hz, and horizontally projected at 15.72 KHz. At this time, the galvanometer sufficiently can make a mechanical response, so that vertical projection of laser beams can be smoothly performed. However, horizontal projection is liable to be irregular, causing picture jitter. One reason for such irregular horizontal projection is that it is difficult to constantly keep the rotation speed of a rotating polygonal mirror. In particular, a rotating polygonal mirror rotating 656 times per second must keep a rotation speed error within about ±0.1% to suppress horizontal picture jitter. However, this rotation speed control is very difficult to realize in practice. Another reason for the irregular horizontal projection is that horizontal projection does not always start on the same perpendicular line since not all 24 reflection planes of a rotating polygonal mirror can have the equal state of machining.

SUMMARY OF THE INVENTION

To solve the above problems, it is an objective of the present invention to provide a laser projection display apparatus which can control the starting point in time of horizontal projection in response to a machining error and rotation speed error of a rotating polygonal mirror so as to suppress horizontal picture jitter.

Accordingly, to achieve the above objective, there is provided a laser projection display apparatus comprising: an optical separating device for separating a white light beam emitted from a first optical source into red, green, and blue monochromic light beams; an image signal processing unit for separating a received composite image signal into an image signal and horizontal and vertical synchronous signals; an optical modulator for modulating the monochromic beams according to the image signal output by the image signal processing unit; a galvanometer and a rotating polygonal mirror for vertically and horizontally projecting the modulated beams, respectively, on a screen; a second optical source for radiating light on the reflection planes of the rotating polygonal mirror; and an optical detector for detecting light emitted from the second optical source and reflected by the reflection planes of the rotating polygonal mirror, and transmitting the detection signal to the image signal processing unit, when a starting point of horizontal projection by the rotating polygonal mirror is made on a predetermined vertical line on the screen, wherein the image signal processing unit synchronizes the image signal with the detection signal of the optical detector and outputs the synchronized image signal to the optical modulator.

The image signal processing unit comprises: a decoder for dividing the composite image signal into the image signal and the vertical and horizontal synchronous signals; an analog-to-digital (A/D) converter for converting the image signal output from the decoder into a digital signal; a memory for storing the digital signal; a read/write controller for outputting a write signal for allowing the digital signal to be stored in the memory, and outputting a read signal for allowing the digital signal stored in the memory to be output upon receiving the detection signal of the optical detector; and a digital-to-analog (D/A) converter for converting the digital signal output by the memory into an analog signal and outputting the analog signal to the optical modulator.

BRIEF DESCRIPTION OF THE DRAWINGS

The above objective and advantage of the present invention will become more apparent by describing in detail a preferred embodiment thereof with reference to the attached drawings in which:

FIG. 3 is a timing diagram illustrating a process in which image signals separated from a composite image signal are stored in a memory and then output in the image signal processing unit of FIG. 2.

DESCRIPTION OF THE PREFERRED EMBODIMENT

Figure 1:
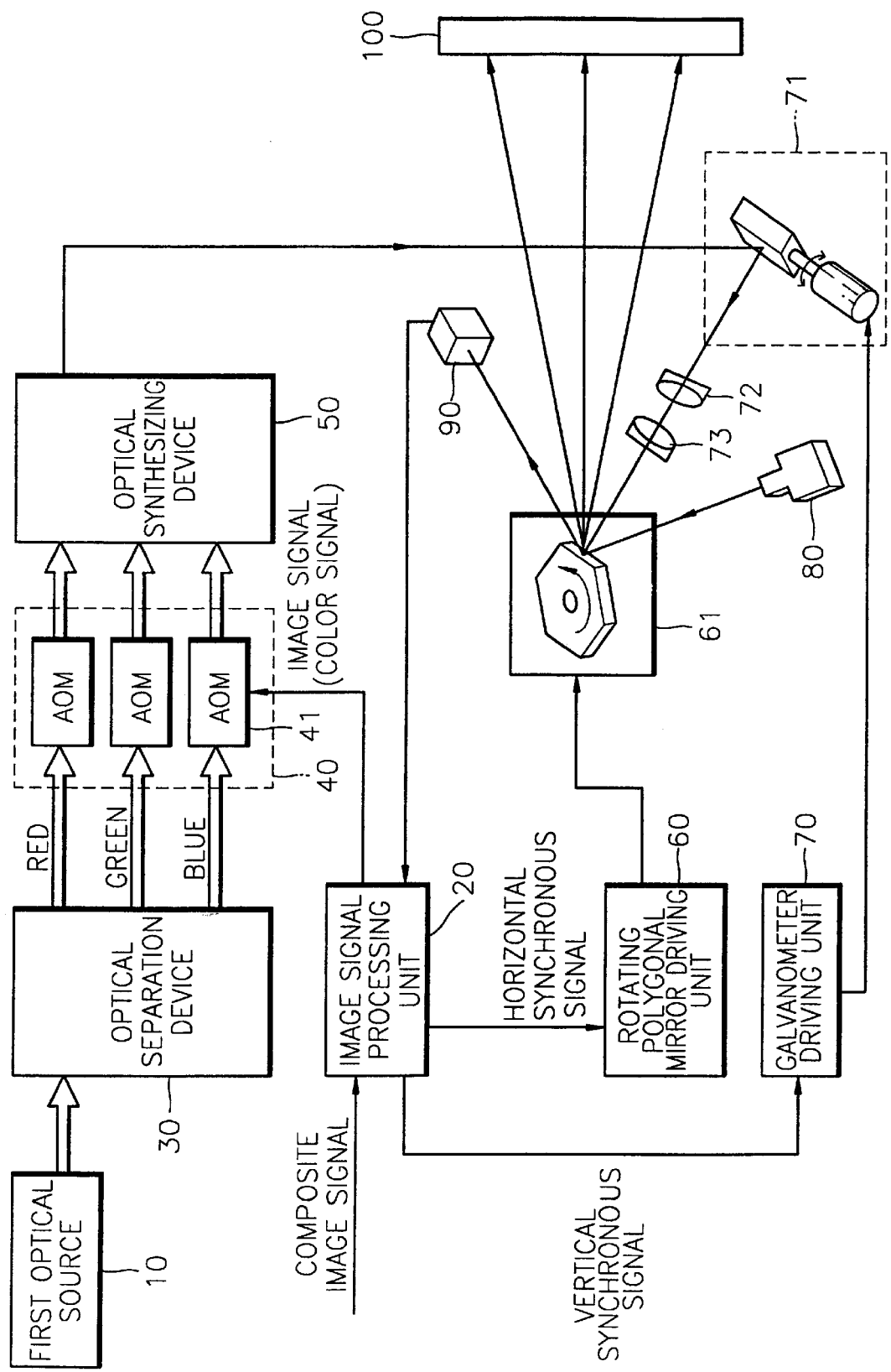
FIG. 1 is a block diagram illustrating the configuration of a laser projection display apparatus according to a preferred embodiment of the present invention.

Referring to FIG. 1, a laser projection display apparatus according to a preferred embodiment of the present invention includes a first optical source 10, an optical separating device 30, an optical modulator 40, an optical synthesizing device 50, an image signal processing unit 20, a rotating polygonal mirror driving unit 60, a rotating polygonal mirror 61, a galvanometer driving unit 70, a galvanometer 71, a second optical source 80, an optical detector 90, and a screen 100. Reference numerals 72 and 73 are relay lenses for focusing light passed through the galvanometer.

In the laser projection display apparatus, a laser beam emitted from the first optical source 10 is modulated according to a color image signal by the optical modulator 40, and then projected to the screen 100 via the galvanometer 71 and the rotating polygonal mirror 61, thereby displaying images.

The optical separating device 30 separates a white beam emitted from the first optical source 10 into red, green, and blue beams. The optical separating device 30 adopts an appropriate color separation optical element such as a plurality of dichroic mirrors.

The optical modulator 40 includes three acoustic-optic modulators 41 for independently modulating the red, green, and blue beams, input from the optical separating device 30, according to a color signal output from the image signal processing unit 20.

The optical synthesizing device 50 synthesizes beams, modulated and output by the acoustic-optic modulators 41, into one beam. The optical synthesizing device 50 can be comprised of optical elements including, for example, a dichroic mirror.

The second optical source 80 and the optical detector 90 monitor the rotation of the rotating polygonal mirror 61 which is driven according to a horizontal synchronous signal output from the image signal processing unit 20, transmit the monitored signal to the image signal processing unit 20, in order to synchronize the point in time of inputting color signals to the optical modulator 40. The second optical source 80 is installed to prevent its emitted light from interfering with picture light projected into the screen 100.

The image signal processing unit 20 processes an input composite image signal, synchronizes color signals according to a received optical signal transmitted from the optical detector 90, and outputs the synchronized color signals to the optical modulator 40. Its detailed configuration is shown in FIG. 2.

Figure 2:
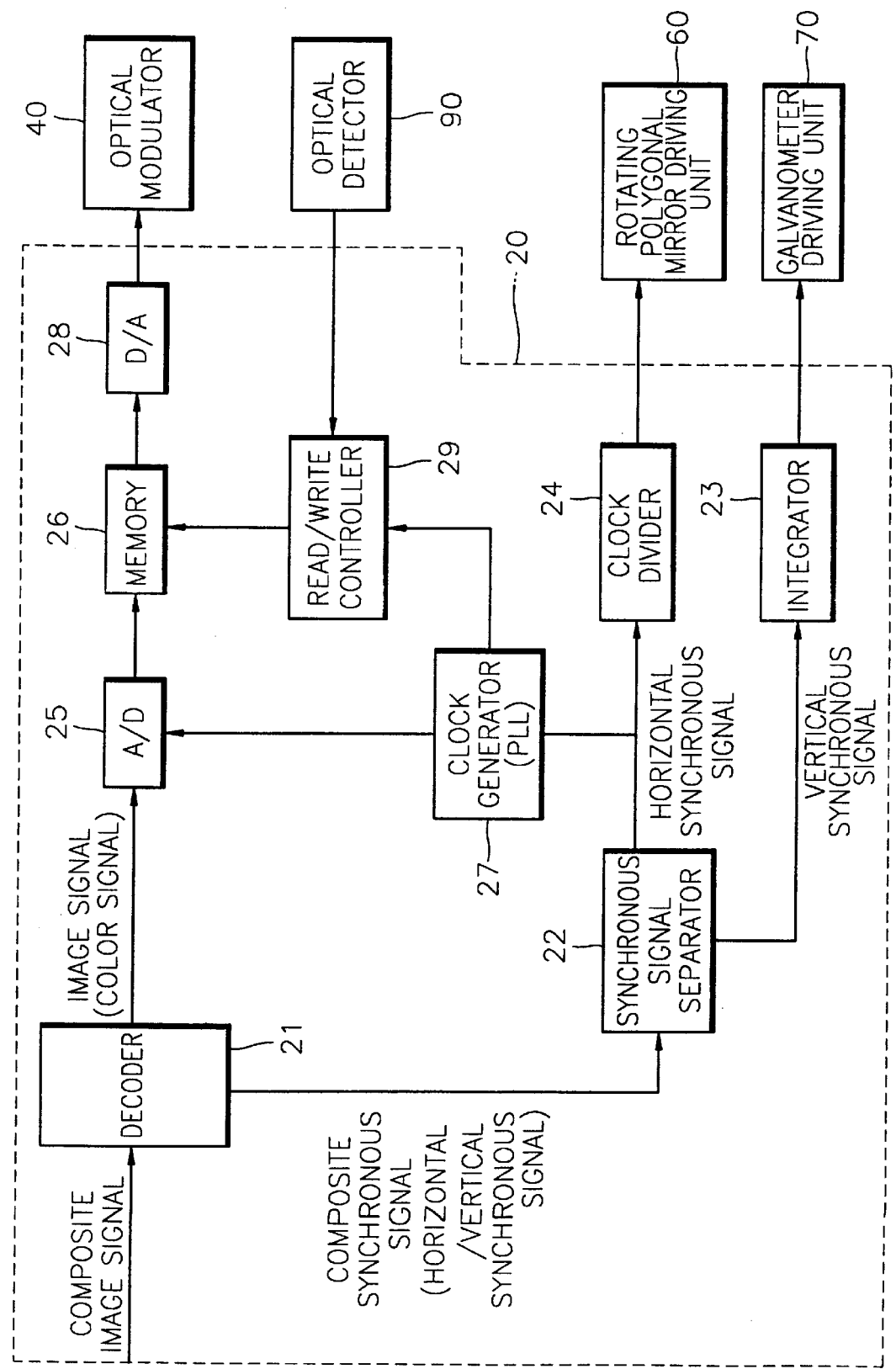
FIG. 2 is a block diagram illustrating the configuration of the image signal processing unit in the laser projection display apparatus of FIG. 1.

A decoder 21 in the image signal processing unit 20 of FIG. 2 divides an input composite image signal into a composite synchronous signal and red, green, and blue signals. A synchronous signal separator 22 separates the composite synchronous signal from the decoder 21 into horizontal and vertical synchronous signals. An integrator 23 receives the vertical synchronous signal and outputs a saw tooth wave signal to a galvanometer driving unit 70. A clock divider 24 generates a driving pulse, for rotating the rotating polygonal mirror 61, from the horizontal synchronous signal. An analog-to-digital (A/D) converter 25 converts an analog color signal output from the decoder 21 into a digital signal, and a memory unit 26 stores the digital signal. A clock generator 27 provides a sampling signal when the analog color signal is converted into a digital signal. A digital-to-analog (D/A) converter 28 converts the digital signal output from the memory unit 26 back into the analog color signal. A read/write control unit 29 gives instructions to read digital data stored in the memory unit 26 according to an optical signal input from the optical detector 90. Here, a frequency synthesizer such as a phase locked loop (PLL) circuit is used as the clock generator 27.

FIG. 3 is a timing diagram illustrating a process in which image signals divided from a composite image signal are stored in the memory unit 26 and then output in the image signal processing unit 20.

The operation of the laser projection display apparatus according to the present invention will now be described referring to FIGS. 1 through 3. First, the composite image signal input to the image signal processing unit 20 is divided into red, green, and blue color signals by the decoder 21, converted into digital signals by the A/D converter 25, and stored in the memory unit 26. The composite synchronous signal divided from the composite image signal by the decoder 21 is again separated into horizontal and vertical synchronous signals by the synchronous signal separator 22. The horizontal synchronous signal is output at a "low" level of a transistor-transistor logic (TTL) at a portion where a horizontal synchronous signal of the composite image signal exists as shown in FIG. 3.

Here, in order to prevent storing of unnecessary data for the first 10μs not relating to color signals, being image information, among the composite image signal having a period of 63.5 μs, a clock signal input from the clock generator 27 in synchronization with the horizontal synchronous signal is counted for 10 μs, and then a write control signal is output from the read/write control unit 29 to the memory unit 26.

The rotating polygonal mirror 61 is rotated according to the horizontal synchronous signal separated from the composite image signal. When the rotating polygonal mirror 61 rotates, beams emitted from the second optical source 80 at a specific point in time are incident upon the optical detector 90, and then a received optical (PD) signal is output from the optical detector 90. The optical detector 90 detects beams when the reflection planes of the rotating polygonal mirror 61 are positioned so as to land beams reflected by the reflection planes on scan starting points along the same vertical line on the screen.

According to the present invention, color signals stored in the memory unit 26 are output when beams are detected by the optical detector 90. That is, when the received optical signal is transmitted from the optical detector 90 to the read/write control unit 29, the read/write control unit 29 outputs a read control signal for allowing image data, corresponding to one scan line, stored in the memory unit 26 to be sequentially output. Accordingly, in the present invention, the horizontal projection synchronization of an image is set not according to the horizontal synchronous signal but according to the received optical signal output by the optical detector 90. Here, the optical design of the optical detector 90 and the second optical source 80 must be considered so that the received optical signal transmitted to the read/write control unit 29 can prevent distortion of pictures by keeping its pulse width as short as possible.

The memory unit 26 outputs data in response to a read signal in an asynchronous system according to the first in first out (FIFO) method by which first input data is output first.

The color signals output by the memory unit 26 are converted into analog signals by the D/A converter 28, modulated according to image color signals by the optical modulator 40, and are projected into the screen 100 via the optical synthesizing system 50.

According to the laser projection display apparatus of the present invention, color signals divided from a composite image signal are temporarily stored in a memory unit, the position of each reflection plane of a rotating polygonal mirror is detected by an optical detector, and the color signals are read and horizontally projected in synchronization with a detection signal of the optical detector in units of one scan line from the memory unit. Thus, the starting point of each horizontal projection line can be placed on the same vertical line. Accordingly, nonuniform horizontal projection can be prevented, which is caused by the variable rotation speed of the rotating polygonal mirror or the machining error of each of the reflection planes of the rotating polygonal mirror. Also, picture jitter in the left and right direction is prevented, and the resolution can be improved.

What is claimed is:

1. A laser projection display apparatus comprising:
   an optical separating device for separating a white light beam emitted from a first optical source into red, green, and blue monochromic light beams;
   an image signal processing unit for separating a received composite image signal into an image signal and horizontal and vertical synchronous signals;
   an optical modulator for modulating the monochromic beams according to the image signal output by the image signal processing unit;
   a galvanometer and a rotating polygonal mirror for vertically and horizontally projecting the modulated beams, respectively, on a screen;
   a second optical source for radiating light on the reflection planes of the rotating polygonal mirror; and an optical detector for detecting light emitted from the second optical source and reflected by the reflection planes of the rotating polygonal mirror, and transmitting the detection signal to the image signal processing unit, when a starting point of horizontal projection by the rotating polygonal mirror is made on a predetermined vertical line on the screen, wherein the image signal processing unit synchronizes the image signal with the detection signal of the optical detector and outputs the synchronized image signal to the optical modulator.

2. The laser projection display apparatus as claimed in claim 1, wherein the image signal processing unit comprises:

a decoder for dividing the composite image signal into the image signal and the vertical and horizontal synchronous signals;

an analog-to-digital (A/D) converter for converting the image signal output from the decoder into a digital signal;

a memory for storing the digital signal;

a read/write controller for outputting a write signal for allowing the digital signal to be stored in the memory, and outputting a read signal for allowing the digital signal stored in the memory to be output upon receiving the detection signal of the optical detector; and a digital-to-analog (D/A) converter for converting the digital signal output by the memory into an analog signal and outputting the analog signal to the optical modulator.

3. The laser projection display apparatus as claimed in claim 1, wherein the optical modulator is comprised of three acoustic-optic modulators to independently modulate the red, green, and blue monochromic beams.

4. The laser projection display apparatus as claimed in claim 3, further comprising an optical synthesizing device for synthesizing the monochromic beams modulated by the acoustic-optic modulators into one light beam and outputting the synthesized light beam to the galvanometer.

5. The laser projection display apparatus as claimed in claim 1, further comprising a relay lens installed on a light path between the galvanometer and the rotating polygonal mirror for focusing light traveling via the galvanometer on the reflection planes of the rotating polygonal mirror.

* * * * *